(12) United States Patent
Kwon et al.

(10) Patent No.: US 10,784,048 B2
(45) Date of Patent: *Sep. 22, 2020

(54) CAPACITOR COMPONENT INCLUDING AMORPHOUS SECOND PHASE

(71) Applicant: SAMSUNG ELECTRO-MECHANICS CO., LTD., Suwon-si, Gyeonggi-do (KR)

(72) Inventors: Hyung Soon Kwon, Suwon-si (KR); Kyoung Jin Cha, Suwon-si (KR); Ji Hong Jo, Suwon-si (KR)

(73) Assignee: SAMSUNG ELECTRO-MECHANICS CO., LTD., Suwon-si, Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/691,782

(22) Filed: Nov. 22, 2019

(65) Prior Publication Data

US 2020/0090873 A1 Mar. 19, 2020

Related U.S. Application Data

(63) Continuation of application No. 16/156,952, filed on Oct. 10, 2018, now Pat. No. 10,529,489.

(30) Foreign Application Priority Data

Aug. 3, 2018 (KR) .................. 10-2018-0090729

(51) Int. Cl.
*H01G 4/30* (2006.01)
*H01G 4/012* (2006.01)
(Continued)

(52) U.S. Cl.
CPC ............ *H01G 4/30* (2013.01); *H01G 4/008* (2013.01); *H01G 4/012* (2013.01); *H01G 4/1227* (2013.01); *H01G 4/248* (2013.01)

(58) Field of Classification Search
CPC .......... H01G 4/30; H01G 4/005; H01G 4/012; H01G 4/228
See application file for complete search history.

(56) References Cited

U.S. PATENT DOCUMENTS 5,712,758 A * 1/1998 Amano ................ H01G 4/2325
361/306.3
10,510,491 B1 * 12/2019 Kwon .................... H01G 4/012
(Continued)

FOREIGN PATENT DOCUMENTS

| JP | 2007-103453 A | 4/2007 |
|---|---|---|
| JP | 2012-256647 A | 12/2012 |
| KR | 10-2014-0081568 A | 7/2014 |

OTHER PUBLICATIONS

Chazono, Hirokazu et al., "dc-Electrical Degradation of the BT-Based Material for Multilayer Ceramic Capacitor with Ni Internal Electrode: Impedance Analysis and Microstructure", Jp. J. Appl. Phs. 40, 5624 (2001).

(Continued)

*Primary Examiner* — Eric W Thomas
(74) *Attorney, Agent, or Firm* — Morgan, Lewis & Bockius LLP

(57) ABSTRACT

A capacitor component includes a body including a dielectric layer and first and second internal electrodes, alternately disposed in a first direction, and first and second external electrodes, respectively disposed on opposite end surfaces of the body in a second direction, perpendicular to the first direction in the body. An amorphous second phase is disposed at an interface between the first and second internal electrodes and the dielectric layer, and ls/le is between 0.02 and 0.07, where ls is a total length of the amorphous second phase disposed in a boundary line between the first or second internal electrode and the dielectric layer in the second (Continued)

direction and le is a length of the first or second internal electrode in the second direction.

13 Claims, 2 Drawing Sheets

(51) Int. Cl.
*H01G 4/008* (2006.01)
*H01G 4/12* (2006.01)
H01G 4/248 (2006.01)

(56) References Cited

U.S. PATENT DOCUMENTS

| | | |
|---|---|---|
| 2007/0074806 A1 | 4/2007 | Kojima et al. |
| 2014/0177133 A1 | 6/2014 | Lee et al. |
| 2016/0293331 A1 | 10/2016 | Kitamura et al. |
| 2017/0032895 A1 | 2/2017 | Ogata et al. |
| 2018/0174753 A1 | 6/2018 | Terashita et al. |

OTHER PUBLICATIONS

Notice of Allowance issued in corresponding U.S. Appl. No. 16/156,952 dated Aug. 21, 2019.
Final Office Action issued in corresponding U.S. Appl. No. 16/156,952 dated Jul. 12, 2019.
Office Action issued in corresponding U.S. Appl. No. 16/156,952 dated Apr. 1, 2019.

\* cited by examiner

I - I'

US 10,784,048 B2

CAPACITOR COMPONENT INCLUDING AMORPHOUS SECOND PHASE

CROSS-REFERENCE TO RELATED APPLICATION(S)

This application is the Continuation application of U.S. patent application Ser. No. 16/156,952 filed on Oct. 10, 2018, which claims the benefit of priority to Korean Patent Application No. 10-2018-0090729 filed on Aug. 3, 2018 in the Korean Intellectual Property Office, the disclosure of which is incorporated herein by reference in its entirety.

BACKGROUND

1. Field

The present disclosure relates to a capacitor component.

2. Description of Related Art

A multilayer ceramic capacitor (MLCC), a capacitor component, is a chip-type capacitor mounted on the printed circuit boards of various electronic products, such as an image display device such as a liquid crystal display (LCD) or a plasma display panel (PDP), a computer, a smartphone, a cellular phone and the like.

Such a multilayer ceramic capacitor may be used as a component of various electronic devices, due to advantages thereof, whereby the MLCC is easily mountable while having a small size and ensured high capacitance. Along with miniaturization and high output of various electronic devices such as a computer and a mobile device, there has been increasing need for miniaturization and high capacitance in a multilayer ceramic capacitor.

To simultaneously achieve miniaturization and high capacitance in a multilayer ceramic capacitor, a thickness of a dielectric layer and an internal electrode needs to be reduced to increase the stack number. Currently, a thickness of a dielectric layer has reached to a level of about 0.6 µm and the dielectric layer has been continuously slimmed.

However, when a dielectric layer is formed with a thickness less than 0.6 µm, it is difficult to ensure withstand voltage characteristics and insulation resistance (IR) of a dielectric layer may increase, lowering the quality and yield of the dielectric layer.

SUMMARY

An aspect of the present disclosure may provide a capacitor component having excellent withstand voltage characteristics.

According to an aspect of the present disclosure, a capacitor component includes a body including a dielectric layer and first and second internal electrodes disposed on opposite sides of the dielectric layer, the first and second internal electrodes being alternately disposed in a first direction; and first and second external electrodes, respectively disposed on opposite end surfaces of the body in a second direction, perpendicular to the first direction in the body. An amorphous second phase is disposed at at least one selected from the group of an interface between the first internal electrode and the dielectric layer and an interface between the second internal electrode and the dielectric layer; and ls/le is between 0.02 and 0.07, where ls is a total length of the amorphous second phase disposed in a boundary line between the first or second internal electrode and the dielectric layer in the second direction and le is a length of the first or second internal electrode in the second direction.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
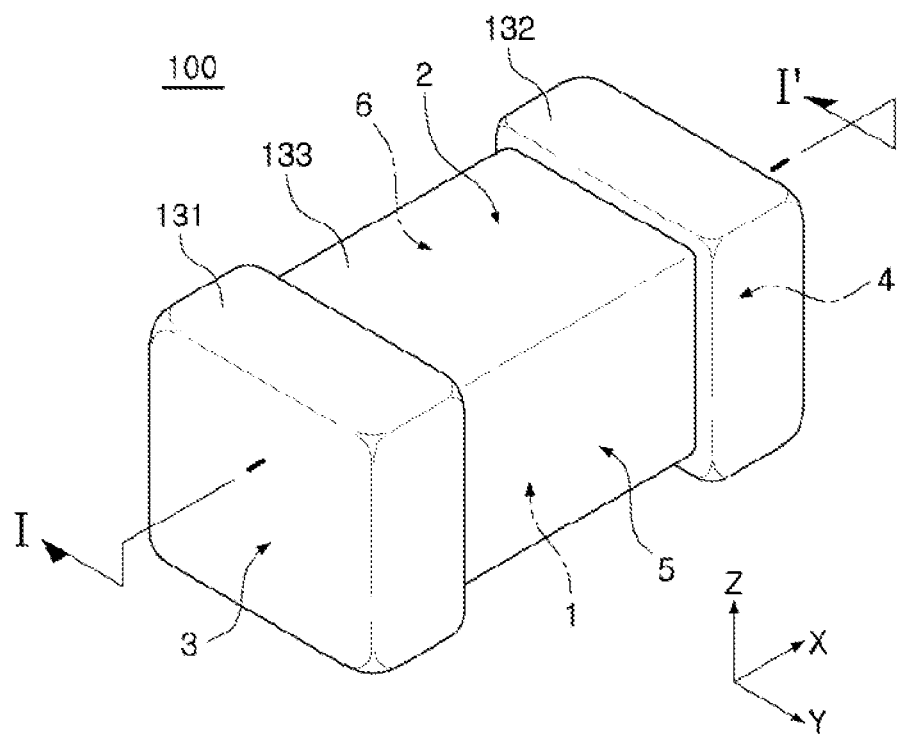
FIG. 1 is a schematic perspective view of a capacitor component according to an exemplary embodiment of the present disclosure.

Hereinafter, exemplary embodiments of the present disclosure will now be described in detail with reference to the accompanying drawings.

In the drawing, the X direction may be defined as a second direction or a longitudinal direction, the Y direction may be defined as a third direction or a width direction, the Z direction may be defined as first direction, a stack direction, or a thickness direction.

Capacitor Component

Figure 2:
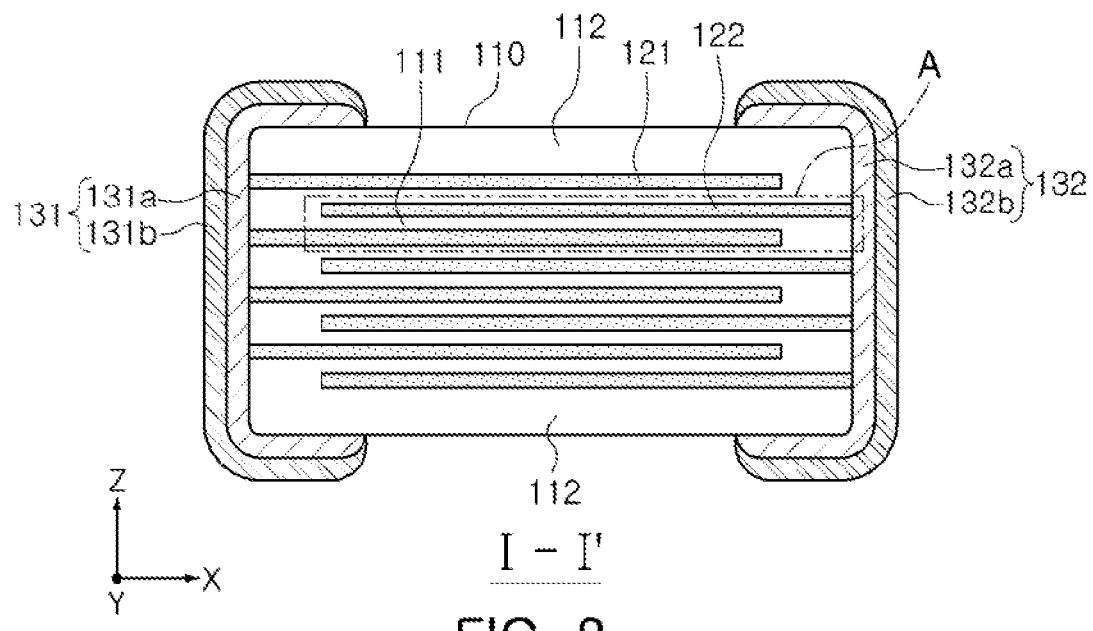
FIG. 2 is a cross-sectional view taken along a line I-I' of FIG. 1.
Figure 3:
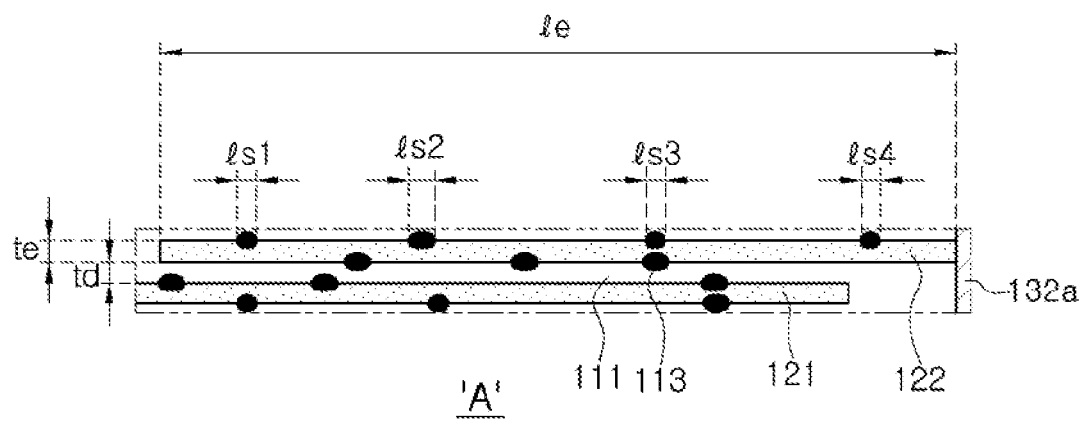
FIG. 3 is an enlarged view of a portion A of FIG. 2.

FIG. 1 is a schematic perspective view of a capacitor component according to an exemplary embodiment of the present disclosure. FIG. 2 is a cross-sectional view taken along a line I-I' of FIG. 1. FIG. 3 is an enlarged view of a portion A of FIG. 2.

Referring to FIGS. 1 to 3, a capacitor component 100 according to an exemplary embodiment of the present disclosure may include a body 110 including a dielectric layer 111 and first and second internal electrodes 121 and 122 that are alternately disposed in the first direction (the Z direction) across the dielectric layer, and first and second external electrodes 131 and 132 that are respectively disposed on opposite end surfaces 3 and 4 in the second direction (X direction) perpendicular to the first direction (the Z direction) in the body and, in this case, an amorphous second phase 113 may be disposed in an interface between the first and second internal electrodes 121 and 122 and the dielectric layer 111 and, with regard to a cross-sectional view in the first and second directions of the body 110, when a total length of the amorphous second phase 113 disposed in a boundary line of the first or second internal electrode and the dielectric layer is defined as ls and a length of the first or second internal electrode is defined as le, a ratio of ls/le may be between 0.02 and 0.07.

The body 110 may be formed in such a way that the dielectric layer 111 and the internal electrodes 121 and 122 are alternately stacked.

A detailed shape of the body 110 is not particularly limited but, as illustrated in the drawings, the body 110 may have a hexahedral shape or a similar shape thereto. Due to contraction of ceramic powder included in the body 110 during a sintering procedure, the body 110 may have a substantially hexahedral shape although the hexahedral shape does not have a complete straight line.

The body 110 may have first and second surfaces 1 and 2 that face each other in the thickness direction (the Z direction), third and fourth surfaces 3 and 4 that are connected to the first and second surfaces 1 and 2 and face each other in the width direction (the Y direction), and fifth and sixth surfaces 5 and 6 that are connected to the first and second surfaces 1 and 2, are connected to the third and fourth surfaces 3 and 4, and face each other in the longitudinal direction (the X direction).

The plurality of dielectric layers 111 forming the capacitor body 110 is in a sintered state and may be integrated into each other in such a way that it is difficult to check a boundary between adjacent dielectric layers 111 without use of a scanning electron microscope (SEM).

A material of the dielectric layer 111 is not particularly limited as long as sufficient capacitance is acquirable and may be, for example, barium titanate ($BaTiO_3$) powder. A material for forming the dielectric layer 111 may be formed by adding various ceramic additives, organic solvents, plasticizers, bonding agents, dispersants, or the like to powder such as barium titanate ($BaTiO_3$) according to the objective of the present disclosure.

The capacitor body 110 may include a cover layer 112 that is formed at each of upper and lower portions thereof, that is, at opposite end portions in the thickness direction (the Z direction) thereof and is formed by stacking dielectric layers without an internal electrode. The cover layer 112 may maintain the reliability of a capacitor with respect to external shocks.

It may not be required to particularly limit the thickness of the cover layer 112. However, to easily achieve miniaturization and high capacitance of a capacitor component, the cover layer 112 may have a thickness equal to or less than 20 μm.

Then, the internal electrodes 121 and 122 and a dielectric layer may be alternately stacked and may include the first and second internal electrodes 121 and 122. The first and second internal electrodes 121 and 122 may be alternately disposed to face each other across the dielectric layer 111 configuring the body 110 and may be exposed through the third and fourth surfaces 3 and 4 of the body 110, respectively.

In this case, the first and second internal electrodes 121 and 122 may be electrically separated from each other by the dielectric layer 111 disposed therebetween.

A material for forming the first and second internal electrodes 121 and 122 is not particularly limited and, for example, the first and second internal electrodes 121 and 122 may be formed of a conductive paste formed of one or more materials of precious metal such as palladium (Pd) or palladium-silver (Pd—Ag) alloy, nickel (Ni), and copper (Cu).

The conductive paste may be printed using a screen printing method, a Gravure printing method, or the like but the present disclosure is not limited thereto.

It may not be required to particularly limit a thickness 'te' of the first and second internal electrodes 121 and 122. However, to easily achieve miniaturization and high capacitance of the capacitor component, the thickness 'te' of the first and second internal electrodes 121 and 122 may be equal to or less than 0.4 μm.

The thickness 'te' of the first and second internal electrodes 121 and 122 may refer to an average thickness of the first and second internal electrodes 121 and 122.

The average thickness of the first and second internal electrodes 121 and 122 may be measured by scanning an image of a cross-sectional view in the longitudinal and thickness directions (L-T) of the body 110 using a scanning electronic microscope (SEM), as shown in FIG. 2.

For example, as shown in FIG. 2, with regard to arbitrary first and second internal electrodes 121 and 122 extracted from the image of the cross-sectional view in the longitudinal and thickness directions (L-T) of the body 110, which is cut at a central portion of a width (W) direction of the body 110 and is scanned using a scanning electronic microscope (SEM), thicknesses may be measured at 30 points spaced apart at equidistant intervals in the longitudinal direction to measure an average value.

The thicknesses may be measured at the 30 points spaced apart at equidistant intervals that is a capacitance formation portion at which the first and second internal electrodes 121 and 122 overlap with each other.

The amorphous second phase 113 may be disposed in an interface between the first and second internal electrodes 121 and 122 and the dielectric layer 111.

A withstand voltage of the capacitor component may be dependent upon insulation resistance (IR) of a chip. In particular, resistance at an interface between the dielectric layer and the internal electrode may be a factor upon which overall IR of the chip is dependent.

According to the present disclosure, the amorphous second phase 113 with high resistance may be disposed in the interface between the first and second internal electrodes 121 and 122 and the dielectric layer 111. The amorphous second phase 113 may have a higher resistance than that of the dielectric layer 111. Accordingly, the overall IR of the chip may be enhanced to improve the withstand voltage characteristics of the capacitor component, thereby enhancing breakdown voltage (BDV) and reliability.

With regard to a cross-sectional view in the first and second directions of the body 110, that is, a cross-sectional in the longitudinal and thickness directions (L-T) of the body, when a total length of the amorphous second phase disposed in a boundary line of the first or second internal electrode and the dielectric layer is defined as ls and a length of the first or second internal electrode is defined as le, a ratio of ls/le may be between 0.02 and 0.07.

When ls/le is less than 0.02, it may be difficult to check whether an amorphous second phase is present in an SEM image and it may also be difficult to ensure sufficient insulation resistance (IR) required to enhance a withstand voltage. On the other hand, when ls/le is greater than 0.07, there is a problem in that capacitance may be lowered due to an excessive amount of amorphous second phase and a non-uniform sintering standard deviation of a dielectric substance may be rather caused, thereby degrading reliability.

Content of a ceramic member including the first and second internal electrodes 121 and 122 or content of additives included in the dielectric layer 111 may be adjusted to adjust ls/le but the present disclosure is not limited thereto.

Referring to FIG. 3, ls may refer to the sum of lengths of all the amorphous second phases 113 disposed in one boundary line between the internal electrodes 121 and 122 and the dielectric layer 111 and le may refer to a length of the one boundary line. That is, in FIG. 3, ls may be the sum of ls1 to ls4.

ls and le may be measured by scanning an image of a cross-sectional view in the longitudinal and thickness directions (L-T) of the body 110 using a scanning electronic microscope (SEM), as shown in FIG. 2.

For example, as shown in FIG. 2, with regard to an arbitrary boundary line between the internal electrode and the dielectric layer extracted from the image of the cross-sectional view in the longitudinal and thickness directions (L-T) of the body 110, which is cut at a central portion of a width (W) direction of the body 110 and is scanned using a scanning electronic microscope (SEM), lengths of the internal electrode and the amorphous second phase may be measured at 30 points spaced apart at equidistant intervals in the longitudinal direction to measure an average value.

In this case, the amorphous second phase 113 may be disposed in a groove portion of the first and second internal electrodes 121 and 122.

Figure 4:
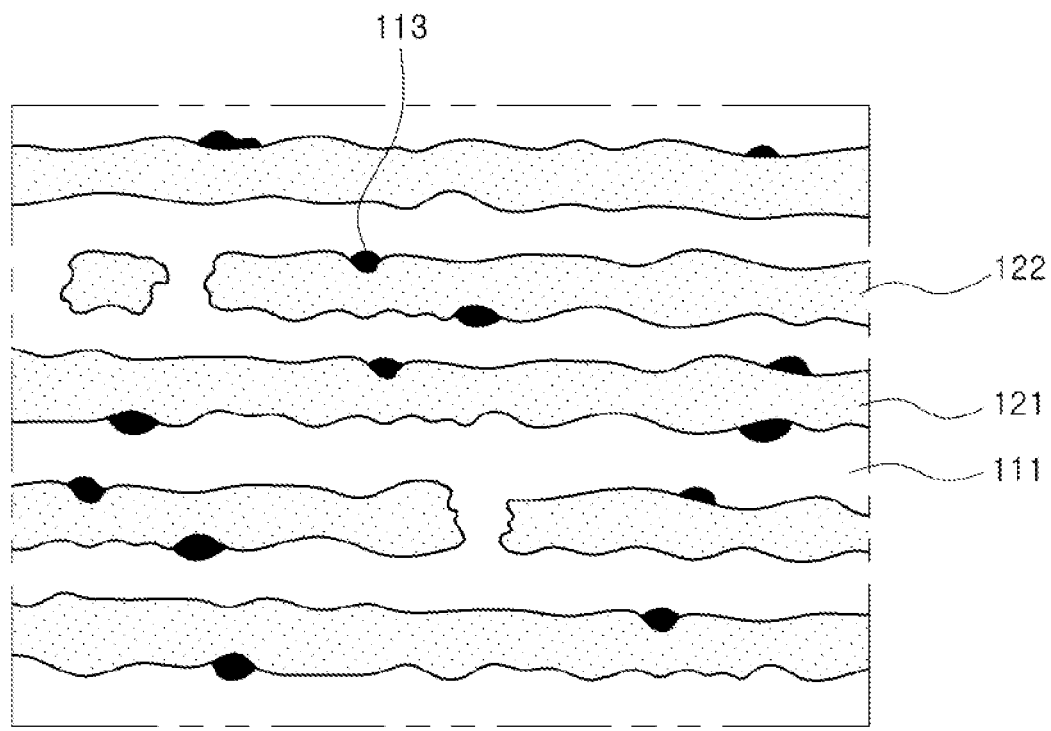
FIG. 4 is a schematic partial enlarged view of an internal portion of a multilayer ceramic capacitor according to an exemplary embodiment of the present disclosure.

As seen from FIG. 4, the amorphous second phase 113 may be mainly disposed in the groove portion of the first and second internal electrodes 121 and 122. Here, the groove portion of the first and second internal electrodes 121 and 122 may refer to a portion of the first and second internal electrodes 121 and 122, a thickness of which is reduced.

As the amorphous second phase 113 is disposed in the groove portion, instability at the interface between the dielectric layer 111 and the internal electrodes 121 and 122 may be lowered to enhance adherence between the dielectric layer and the internal electrode. However, it may be noted that the amorphous second phase 113 may also be disposed at portions of the interface that are not the groove portion.

The amorphous second phase 113 may include at least one selected from the group of magnesium (Mg), aluminum (Al), manganese (Mn), vanadium (V), and dysprosium (Dy).

This is because, when the amorphous second phase 113 includes at least one selected from the group of Mg, Al, Mn, V, and Dy, a second phase is more easily formed.

The amorphous second phase 113 may include at least one selected from the group of nickel (Ni) and tin (Sn).

When the internal electrodes 121 and 122 include Ni, Ni of the internal electrodes 121 and 122 may be moved to an interface thereof while being sintered and may be included in the amorphous second phase 113.

When the internal electrodes 121 and 122 include Sn, since Sn has a lower melting point than Ni and has excellent wettability with Ni while not being appropriately solid-solved in Ni, an internal electrode may be prevented from being grown to form the internal electrode with a small thickness. Sn has a lower melting point than Ni and, thus, Ni is first moved to an interface between the dielectric layer 111 and the internal electrodes 121 and 122 while the internal electrodes are sintered and, accordingly, Ni may be included in the amorphous second phase 113. In addition, as the internal electrode is sintered, both Sn and Ni may be included in the amorphous second phase 113.

The amorphous second phase 113 may include at least one selected from the group of Ni and Sn and may further include sulfur (S). For example, when a conductive paste including Ni powder coated with S is used as a material for forming an internal electrode, S may also be included in the amorphous second phase 113.

It may not be required to particularly limit a thickness td of the dielectric layer 111.

However, when the dielectric layer is formed with a small thickness less than 0.6 µm, in particular, when the thickness td of the dielectric layer is equal to or less than 0.4 µm, the number of dielectric grains to be present per layer of the dielectric layer is limited and, thus, there is a problem in that it is difficult to ensure withstand voltage characteristics and there is a problem in that an error in terms of insulation resistance (IR) of a dielectric layer increases to lower the quality and yield of the dielectric layer.

According to an exemplary embodiment of the present disclosure, when the amorphous second phase 113 with high resistance is disposed in the interface between the first and second internal electrodes 121 and 122 and the dielectric layer 111, overall IR of a chip is enhanced to improve withstand voltage characteristics of a capacitor component and breakdown voltage (BDV) and reliability are improved and, thus, when a thickness td of the dielectric layer is equal to or less than 0.4 µm, sufficient withstand voltage characteristics may be ensured.

Accordingly, when the thickness td of the dielectric layer 111 is equal to or less than 0.4 µm, an effect of enhancing withstand voltage characteristics, breakdown voltage (BDV), and reliability according to the present disclosure may be relatively remarkable.

The thickness td of the dielectric layer 111 may refer to an average thickness of the dielectric layers 111 between the first and second internal electrodes 121 and 122.

The average thickness of the dielectric layer 111 may be measured by scanning an image of a cross-sectional view in the longitudinal and thickness directions (L-T) of the body 110 using a scanning electronic microscope (SEM), as shown in FIG. 2.

For example, as shown in FIG. 2, with regard to an arbitrary dielectric layer extracted from the image of the cross-sectional view in the longitudinal and thickness directions (L-T) of the body 110, which is cut at a central portion of a width (W) direction of the body 110 and is scanned using a scanning electronic microscope (SEM), thicknesses may be measured at 30 points spaced apart at equidistant intervals in the longitudinal direction to measure an average value.

The thicknesses may be measured at the 30 points spaced apart at equidistant intervals that is a capacitance formation portion at which the first and second internal electrodes 121 and 122 overlap with each other.

The external electrodes 131 and 132 may be disposed on the body 110 and may be connected to the internal electrodes 121 and 122. As shown in FIG. 2, the capacitor component 100 may include the first and second internal electrodes 121 and 122 and the first and second external electrodes 131 and 132 connected thereto, respectively. According to the present embodiment, although the structure in which the capacitor component 100 includes two external electrodes 131 and 132 is described, the number, the shape, or the like of the external electrodes 131 and 132 may be changed depending on a shape of the internal electrodes 121 and 122 or other objectives.

The external electrodes 131 and 132 may be formed of any material as long as the material has electrical conductivity, such as metal, a detailed material may be determined in consideration of electrical characteristics, structural stability, and so on, and the external electrodes 131 and 132 may have a multilayer structure.

For example, the external electrodes 131 and 132 may include electrode layers 131a and 132a disposed in the body 110 and plating layers 131b and 132b formed on the electrode layers 131a and 132a.

As a more detailed example of the electrode layers 131a and 132a, the electrode layers 131a and 132a may be a sintered electrode including conductive metal and glass and, in this case, the conductive metal may be Cu. In addition, the electrode layers 131a and 132a may be a resin-based electrode including a plurality of metallic particles and conductive resin.

As a more detailed example of the plating layers 131b and 132b, the plating layers 131b and 132b may be an Ni plating layer or an Sn plating layer, may be formed in such a way that an Ni plating layer and an Sn plating layer are sequentially formed on the electrode layers 131a and 132a, or may include a plurality of Ni plating layers and/or a plurality of Sn plating layers.

It may not be required to particularly limit a size of the capacitor component 100.

However, to simultaneously achieve miniaturization and high capacitance, a thickness of a dielectric layer and an internal electrode needs to be reduced and a stack number needs to be increased and, thus, an effect of enhancing withstand voltage characteristics, breakdown voltage (BDV), and reliability according to the present disclosure may be relatively remarkable in a capacitor component having a size equal to or less than 0402 (0.4 mm×0.2 mm).

Accordingly, when a length in the second direction of the body is defined as L and a length in a third direction of the capacitor component is defined as W, and the third direction is perpendicular to the first direction and the second direction in the body, L may be equal to or less than 0.4 mm and W may be equal to or less than 0.2 mm. That is, the capacitor component having a size equal to or less than 0402 (0.4 mm×0.2 mm) may be provided.

As set forth above, according to an exemplary embodiment in the present disclosure, as one of various effects according to the present invention, a capacitor component having excellent withstand voltage characteristics may be provided.

While exemplary embodiments have been shown and described above, it will be apparent to those skilled in the art that modifications and variations could be made without departing from the scope of the present disclosure as defined by the appended claims.

What is claimed is:

1. A capacitor component comprising:
a body including a dielectric layer and first and second internal electrodes disposed on opposite sides of the dielectric layer, the first and second internal electrodes being alternately disposed in a first direction; and
first and second external electrodes, respectively disposed on opposite end surfaces of the body in a second direction, perpendicular to the first direction in the body,
wherein at least one of the first or second internal electrode includes palladium (Pd) or palladium-silver (Pd-Ag), and an amorphous second phase is disposed at an interface between the dielectric layer and the first or second internal electrode including palladium (Pd) or palladium-silver (Pd-Ag); and
wherein ls/le is between 0.02 and 0.07, where ls is a total length of the amorphous second phase disposed in a boundary line between the first or second internal electrode including palladium (Pd) or palladium-silver (Pd-Ag) and the dielectric layer in the second direction and le is a length of the first or second internal electrode including palladium (Pd) or palladium-silver (Pd-Ag) in the second direction.

2. The capacitor component of claim 1, wherein the amorphous second phase is disposed in a groove portion of the first and second internal electrodes.

3. The capacitor component of claim 1, wherein the amorphous second phase includes at least one selected from the group of magnesium (Mg), aluminum (Al), manganese (Mn), vanadium (V), and dysprosium (Dy).

4. The capacitor component of claim 1, wherein the amorphous second phase includes at least one selected from the group of nickel (Ni) and tin (Sn).

5. The capacitor component of claim 4, wherein the amorphous second phase further includes sulfur (S).

6. The capacitor component of claim 1, wherein the dielectric layer has a thickness equal to or less than 0.4 μm.

7. The capacitor component of claim 1, wherein the first and second internal electrodes have a thickness equal to or less than 0.4 μm.

8. The capacitor component of claim 1, wherein a cover portions including a dielectric layer is disposed at opposite end portions in the first direction of the body and has a thickness equal to or less than 20 μm.

9. The capacitor component of claim 1, wherein, when a length in the second direction of the body is defined as L and a length in a third direction of the body is defined as W, and the third direction is perpendicular to the first direction and the second direction in the body, L is equal to or less than 0.4 mm and W is equal to or less than 0.2 mm.

10. The capacitor component of claim 1, wherein ls and le are measured using a cross-sectional view in the first and second directions of the body.

11. The capacitor component of claim 10, wherein the amorphous second phase has a higher resistance than that of the dielectric layer.

12. The capacitor component of claim 1, wherein the amorphous second phase includes at least one of aluminum (Al), vanadium (V), dysprosium (Dy), tin (Sn), or sulphur (S).

13. The capacitor component of claim 1, wherein lst/le is between 0.02 and 0.07, where lst is a total length of all phases, including the amorphous second phase, disposed in a boundary line between the first or second internal electrode and the dielectric layer in the second direction and le is the length of the first or second internal electrode in the second direction.

* * * * *